(12) United States Patent
Esseghir et al.

(10) Patent No.: US 8,603,635 B2
(45) Date of Patent: Dec. 10, 2013

(54) FLEXIBLE, MOLDED OR EXTRUDED ARTICLES AND SEMICONDUCTIVE COMPOUNDS FOR THEIR MANUFACTURE

(75) Inventors: Mohamed Esseghir, Monroe Township, NJ (US); Jeffrey M. Cogen, Flemington, NJ (US)

(73) Assignee: Union Carbide Chemicals & Plastics Technology LLC, Midland, MI (US)

( * ) Notice: Subject to any disclaimer, the term of this patent is extended or adjusted under 35 U.S.C. 154(b) by 58 days.

(21) Appl. No.: 13/496,532

(22) PCT Filed: Sep. 8, 2010

(86) PCT No.: PCT/US2010/048075
§ 371 (c)(1),
(2), (4) Date: Mar. 16, 2012

(87) PCT Pub. No.: WO2011/037747
PCT Pub. Date: Mar. 31, 2011

(65) Prior Publication Data
US 2012/0171496 A1   Jul. 5, 2012

Related U.S. Application Data

(60) Provisional application No. 61/244,618, filed on Sep. 22, 2009.

(51) Int. Cl.
*B32B 27/40* (2006.01)
*B32B 1/24* (2006.01)
*B32B 27/00* (2006.01)
*B32B 9/04* (2006.01)
*B32B 15/08* (2006.01)

(52) U.S. Cl.
USPC ..... 428/423.1; 428/447; 428/500; 428/424.8; 428/425.5; 428/462; 428/515; 252/511

(58) Field of Classification Search
USPC ........ 428/423.1, 424.8, 425.5, 447, 462, 500, 428/515; 252/511
See application file for complete search history.

(56) References Cited

U.S. PATENT DOCUMENTS

| | | | |
|---|---|---|---|
| 4,857,600 A | 8/1989 | Gross et al. | |
| 5,246,783 A | 9/1993 | Spenadel et al. | |
| 5,272,236 A | 12/1993 | Lai et al. | |
| 5,278,272 A | 1/1994 | Lai et al. | |
| 5,575,965 A | 11/1996 | Caronia et al. | |
| 5,986,028 A | 11/1999 | Lai et al. | |
| 7,355,089 B2 | 4/2008 | Chang et al. | |
| 7,390,970 B2 * | 6/2008 | Lee et al. | 174/102 SC |
| 2001/0014709 A1 | 8/2001 | Tsukada et al. | |

FOREIGN PATENT DOCUMENTS

| | | |
|---|---|---|
| EP | 1619217 | 1/2006 |
| WO | 0041187 | 7/2000 |
| WO | 2005059008 | 6/2005 |
| WO | 2006007268 | 1/2006 |

* cited by examiner

*Primary Examiner* — Thao T. Tran
(74) *Attorney, Agent, or Firm* — Whyte Hirschboeck Dudek S.C.

(57) ABSTRACT

A molded or extruded article, e.g., an electrical part or shielded cable, comprises at least one insulation layer and at least one semiconductive layer, the semiconductive layer thick and comprising in weight percent: A. 1 to 30 wt % of conductive filler; B. 10 to 90 wt % of a non-olefin elastomer; C. 10 to 90 wt % of an olefin elastomer; and D. Optionally, 0.5 to 2.5 wt % of peroxide. Carbon black and/or metal particulates or powder typically comprise the filler, silicone or urethane rubber the non-olefin elastomer, and EPR or EPDM the olefin elastomer.

13 Claims, No Drawings

FLEXIBLE, MOLDED OR EXTRUDED ARTICLES AND SEMICONDUCTIVE COMPOUNDS FOR THEIR MANUFACTURE

CROSS-REFERENCE TO RELATED APPLICATIONS

This application claims the benefit of U.S. Provisional Application No. 61/244,618 filed on Sep. 22, 2009, the contents of which are herein incorporated by reference in its entirety.

FIELD OF THE INVENTION

This invention relates to flexible, molded or extruded plastic articles. In one embodiment, the invention relates to semiconductive flexible, molded or extruded plastic articles while in another aspect, the invention relates to a process for making such articles. In yet another aspect, the invention relates to such articles comprising one or more components comprising a mixture of conductive carbon black and a blend of dissimilar elastomeric compounds.

BACKGROUND OF THE INVENTION

In electrical power cable connector applications, a desirable feature is the flexibility of the connector for ease of installation. This is particularly important for the so-called pre-molded "slip-on" connectors which are not factory pre-stretched and where a tight fit is required to prevent moisture ingress to the cable connection (which can lead to electrical failure).

These connectors generally comprise an inner semiconductive layer, a thicker insulation layer and an outer semiconductive layer which covers the entire body of the part. The desired level of conductivity of the semiconductive layer is measured by the volume resistivity of the material which for this type of application is less than (<) 1000 ohms per centimeter (ohm-cm) and preferably <500 ohm-cm. Preferably, the volume resistivity is stable under cable operating conditions (generally 0 to 95° C.).

For a typical part made of an ethylene/propylene/diene monomer (EPDM) based material, the amount of conductive carbon black needed to achieve the required volume resistivity is generally greater than (>) 30 weight percent (wt %). This is known as the percolation threshold. Since carbon black acts as a reinforcing agent, this level of conductive filler can significantly reduce the flexibility of the material to such a point that the semiconductive layer is much stiffer compared to the insulation layer. In other words, the flexibility of the finished molded part is severely compromised because of the higher stiffness of the outer and inner semiconductive layers.

Formulation approaches using plasticizing oils and waxes to improve flexibility are known in the literature, but are generally limited in scope and teaching. Thus, a need exists for technology to improve the flexibility of the semiconductive layer in order to improve the overall part flexibility, yet maintain the desired volume resistivity of the cable at its expected operating conditions. One approach is the use non-polyolefin based resins, e.g., silicone rubber for the semiconductive compound. Such technology exists and is in use, for example, in the so-called cold shrink connectors. However, the cost of these materials is significantly higher compared to that of polyolefin-based compounds. Moreover, the tear strength of silicone rubber is generally lower compared to the tear strength of polyolefin rubber materials.

SUMMARY OF THE INVENTION

In one embodiment the invention is a molded or extruded article comprising at least one insulation layer and at least one semiconductive layer, the semiconductive layer comprising in weight percent:
  A. 1 to 30 wt % of conductive filler;
  B. 10 to 90 wt % of a non-olefin elastomer;
  C. 10 to 90 wt % of an olefin elastomer; and
  D. Optionally, 0.5 to 2.5 wt % of peroxide.

In one embodiment the filler is conductive carbon black and/or a metal particulate or powder. In one embodiment the non-olefin elastomer is a silicone and/or urethane rubber. In one embodiment the olefin elastomer is an ethylene-propylene rubber and/or an EPDM rubber.

In one embodiment the invention is an injection molded article comprising the semiconductive layer. In one embodiment the invention is an injection molded electrical connector comprising an insulation layer sandwiched between inner and outer (or first and second) semiconductive layers, typically with the insulation layer in direct contact with both the inner and outer semiconductor layers. The electrical connector typically has volume resistivity of less than 1,000 ohm-cm, preferably less than 500 ohm-cm.

In one embodiment the invention is an extruded article comprising the semiconductive layer. In one embodiment the invention is a flexible, shielded cable comprising an insulation layer sandwiched between inner and outer (or first and second) semiconductive layers, typically with the insulation layer in direct contact with both the inner and outer semiconductor layers. The electrical connector typically has volume resistivity of less than 1,000 ohm-cm, preferably less than 500 ohm-cm.

In one embodiment the invention is a semiconductive composition comprising in weight percent:
  A. 1 to 30 wt % of conductive filler;
  B. 10 to 90 wt % of a non-olefin elastomer;
  C. 10 to 90 wt % of an olefin elastomer; and
  D. Optionally, 0.5 to 2.5 wt % of peroxide.

DETAILED DESCRIPTION OF THE PREFERRED EMBODIMENT

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of synthetic techniques, definitions (to the extent not inconsistent with any definitions specifically provided in this disclosure), and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, viscosity, melt index, etc., is from 100 to 1,000, it is intended that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the component amounts of the composition and various properties of the composition components.

"Cable" and like terms mean at least one wire or optical fiber within a protective insulation, jacket or sheath. Typically, a cable is two or more wires or optical fibers bound together, typically in a common protective insulation, jacket or sheath. The individual wires or fibers inside the jacket may be bare, covered or insulated. Combination cables may contain both electrical wires and optical fibers. The cable, etc. can be designed for low, medium and high voltage applications. Typical cable designs are illustrated in U.S. Pat. Nos. 5,246,783, 6,496,629 and 6,714,707.

"Polymer" means a compound prepared by reacting (i.e., polymerizing) monomers, whether of the same or a different type. The generic term polymer thus embraces the term "homopolymer", usually employed to refer to polymers prepared from only one type of monomer, and the term "interpolymer" as defined below.

"Interpolymer" and "copolymer" mean a polymer prepared by the polymerization of at least two different types of monomers. These generic terms include both classical copolymers, i.e., polymers prepared from two different types of monomers, and polymers prepared from more than two different types of monomers, e.g., terpolymers, tetrapolymers, etc.

"Olefin" and like terms mean an unsaturated, aliphatic or alicyclic, substituted or unsubstituted hydrocarbon having one or more double bonds. "Substituted olefin" means an olefin in which one or more hydrogen atoms bound to any carbon of the olefin is replaced by another group such as a halogen, aryl, substituted aryl, cycloalkyl, substituted cycloalkyl, hetero-cycloalkyl, substituted hetero-cycloalkyl, halogen, haloalkyl, hydroxy, phosphido, alkoxy, amino, thio, nitro, or a combinations of two or more such substituents.

"Elastomer" and like terms means a rubber-like polymer that can be stretched to at least twice its original length and which retracts very rapidly to approximately its original length when the force exerting the stretching is released. An elastomer has an elastic modulus of about 10,000 psi (68.95 MPa) or less and an elongation usually greater than 200% in the uncrosslinked state at room temperature using the method of ASTM D638-72.

"Olefin elastomer" and like terms mean an elastomeric polymer comprising at least 50 mole percent (mol %) of units derived from one or more olefins.

"Non-olefin elastomer" and like terms mean an elastomeric polymer containing at least 50 mol % of units derived from monomers other than olefin.

"Ethylene elastomer" and like terms mean an elastomeric polymer comprising at least 50 mol % units derived from ethylene.

"Blend," "polymer blend" and like terms mean a blend of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art.

"Composition" and like terms mean a mixture or blend of two or more components. For example, in the context of preparing a semiconductive injection molded article of this invention, a composition would include at least one conductive filler, at least one non-olefin elastomer, at least one olefin elastomer, and at least one free radical initiator.

"Crosslinked", "cured" and similar terms mean that the polymer, before or after it is shaped into an article, was subjected or exposed to a treatment which induced crosslinking and has xylene or decalene extractables between 40 and 100 weight percent (i.e., greater than or equal to 40 weight percent gel content).

"Crosslinkable", "curable" and like terms means that the polymer, before or after shaped into an article, is not cured or crosslinked and has not been subjected or exposed to treatment that has induced substantial crosslinking although the polymer comprises additive(s) or functionality which will cause, promote or enable substantial crosslinking upon subjection or exposure to such treatment (e.g., exposure to water).

Olefin Elastomer

The olefin elastomers useful in the practice of this invention include both polyolefin homopolymers and interpolymers. Examples of polyolefin homopolymers are the homopolymers of ethylene and propylene. Examples of the polyolefin interpolymers are the ethylene/α-olefin interpolymers and the propylene/α-olefin interpolymers. The α-olefin is preferably a $C_{3-20}$ linear, branched or cyclic α-olefin (for the propylene/α-olefin interpolymers, ethylene is considered an α-olefin). Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins can also contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, for purposes of this invention certain cyclic olefins, such as norbornene and related olefins, are α-olefins and can be used in place of some or all of the α-olefins described above. Similarly, styrene and its related olefins (for example, α-methylstyrene, etc.) are α-olefins for purposes of this invention. Illustrative polyolefin copolymers include ethylene/propylene, ethylene/butene, ethylene/1-hexene, ethylene/1-octene, ethylene/styrene, and the like. Illustrative terpolymers include ethylene/propylene/1-octene, ethylene/propylene/butene, ethylene/butene/1-octene, and ethylene/butene/styrene. The copolymers can be random or blocky.

The olefin elastomer can also comprise one or more functional groups such as an unsaturated ester or acid, and these elastomers (polyolefins) are well known and can be prepared by conventional high-pressure techniques. The unsaturated esters can be alkyl acrylates, alkyl methacrylates, or vinyl carboxylates. The alkyl groups can have 1 to 8 carbon atoms and preferably have 1 to 4 carbon atoms. The carboxylate groups can have 2 to 8 carbon atoms and preferably have 2 to 5 carbon atoms. The portion of the copolymer attributed to the ester comonomer can be in the range of 1 up to 50 percent by weight based on the weight of the copolymer. Examples of the acrylates and methacrylates are ethyl acrylate, methyl acrylate, methyl methacrylate, t-butyl acrylate, n-butyl acrylate, n-butyl methacrylate, and 2-ethylhexyl acrylate. Examples of the vinyl carboxylates are vinyl acetate, vinyl propionate, and vinyl butanoate. Examples of the unsaturated acids include acrylic acids or maleic acids.

Functional groups can also be included in the olefin elastomer through grafting which can be accomplished as is commonly known in the art. In one embodiment, grafting may occur by way of free radical functionalization which typically includes melt blending an olefin polymer, a free radical initiator (such as a peroxide or the like), and a compound containing a functional group. During melt blending, the free radical initiator reacts (reactive melt blending) with the olefin polymer to form polymer radicals. The compound containing a functional group bonds to the backbone of the polymer radicals to form a functionalized polymer. Exemplary compounds containing functional groups include but are not limited to alkoxysilanes, e.g., vinyl trimethoxysilane, vinyl triethoxysilane, and vinyl carboxylic acids and anhydrides, e.g., maleic anhydride.

More specific examples of olefin elastomers useful in this invention include very low density polyethylene (VLDPE) (e.g., FLEXOMER® ethylene/1-hexene polyethylene made by The Dow Chemical Company), homogeneously branched, linear ethylene/α-olefin copolymers (e.g. TAFMER® by Mitsui Petrochemicals Company Limited and EXACT® by Exxon Chemical Company), homogeneously branched, substantially linear ethylene/α-olefin polymers (e.g., AFFINITY® and ENGAGES polyethylene available from The Dow Chemical Company), and olefin block copolymers such as those described in U.S. Pat. No. 7,355,089 (e.g., INFUSE® available from The Dow Chemical Company). The more preferred polyolefin copolymers are the homogeneously branched linear and substantially linear ethylene copolymers. The substantially linear ethylene copolymers are especially preferred, and are more fully described in U.S. Pat. Nos. 5,272,236, 5,278,272 and 5,986,028.

The olefin elastomers useful in the practice of this invention also include propylene, butene and other alkene-based copolymers, e.g., copolymers comprising a majority of units derived from propylene and a minority of units derived from another α-olefin (including ethylene). Exemplary propylene polymers useful in the practice of this invention include the VERSIFY® polymers available from The Dow Chemical Company, and the VISTAMAXX® polymers available from ExxonMobil Chemical Company.

Blends of any of the above olefinic elastomers can also be used in this invention, and the olefin elastomers can be blended or diluted with one or more other polymers to the extent that, in a preferred mode, the olefin elastomers of this invention constitute at least about 50, preferably at least about 75 and more preferably at least about 80, weight percent of the thermoplastic polymer component of the blend and retain their flexibility. In a less preferred mode and depending on other properties that may be sought, the olefin elastomer content may be less than 50% of the thermoplastic polymer component.

The olefin elastomers, particularly the ethylene elastomers, useful in the practice of this invention typically have, before grafting, a density of less than 0.91, preferably less than 0.90, grams per cubic centimeter (g/cm$^3$). The ethylene copolymers typically have a density greater than 0.85, preferably greater than 0.86, g/cm$^3$. Density is measured by the procedure of ASTM D-792. Generally, the greater the α-olefin content of the interpolymer, the lower the density and the more amorphous the interpolymer. Low density polyolefin copolymers are generally characterized as semi-crystalline, flexible and having good optical properties, e.g., high transmission of visible and UV-light and low haze.

The ethylene elastomers useful in the practice of this invention typically have, before grafting, a melt index greater than 0.10 and preferably greater than 1 gram per 10 minutes (g/10 min). The ethylene elastomers typically have a melt index of less than 500 and preferably of less than 100, g/10 min. Melt index is measured by the procedure of ASTM D-1238 (190° C./2.16 kg).

The olefin elastomer is typically used in amounts ranging from 10 to 90 wt % based on the weight of the composition. Preferably, the olefin elastomer is used in an amount ranging from 20 to 80, more preferably from 25 to 50, wt % based on the weight of the composition.

Non-Olefin Elastomers

The non-olefin elastomers useful in the practice of this invention include the silicone and urethane elastomers, styrene-butadiene rubber (SBR), nitrile rubber, chloroprene, fluoroelastomers, perfluoroelastomers, polyether block amides and chlorosulfonated polyethylene. The silicone elastomers are polyorganosiloxanes typically have an average unit formula $R_aSiO_{(4-a)/2}$ which may have a linear or partially-branched structure but is preferably linear. Each R may be the same or different. R is a substituted or non-substituted monovalent hydrocarbon group which may be, for example, an alkyl group, such as a methyl, ethyl, propyl, butyl, and octyl groups; aryl groups such as phenyl and tolyl groups; aralkyl groups; alkenyl groups, for example, vinyl, allyl, butenyl, hexenyl, and heptenyl groups; and halogenated alkyl groups, for example chloropropyl and 3,3,3-trifluoropropyl groups. The polyorganosiloxane may be-terminated by any of the above groups or with hydroxyl groups. When R is an alkenyl group the alkenyl group is preferably a vinyl group or hexenyl group. Indeed alkenyl groups may be present in the polyorganosiloxane on terminal groups and/or polymer side chains.

Representative silicone rubbers or polyorganosiloxanes include, but are not limited to, dimethylvinylsiloxy-terminated polydimethylsiloxane, trimethylsiloxy-terminated polydimethylsiloxane, trimethylsiloxy-terminated copolymer of methylvinylsiloxane and dimethylsiloxane, dimethylvinylsiloxy-terminated copolymer of methylvinylsiloxane and dimethylsiloxane, dimethylhydroxysiloxy-terminated polydimethylsiloxane, dimethylhydroxysiloxy-terminated copolymer of methylvinylsiloxane and dimethylsiloxane, methylvinylhydroxysiloxy-terminated copolymer of methylvinylsiloxane and dimethylsiloxane, dimethylhexenylsiloxy-terminated polydimethylsiloxane, trimethylsiloxy-terminated copolymer of methylhexenylsiloxane and dimethylsiloxane, dimethylhexenylsiloxy-terminated copolymer of methylhexenylsiloxane and dimethylsiloxane, dimethylvinylsiloxy-terminated copolymer of methylphenylsiloxane and dimethylsiloxane, dimethylhexenylsiloxy-terminated copolymer of methylphenylsiloxane and dimethylsiloxane, dimethylvinylsiloxy-terminated copolymer of methyl(3,3,3-trifluoropropyl)siloxane and dimethylsiloxane, and dimethylhexenylsiloxy-terminated copolymer of methyl (3,3,3-trifluoropropyl)siloxane and dimethylsiloxane.

The urethane elastomers are prepared from reactive polymers such as polyethers and polyesters and isocyanate functional organic compounds. One typical example is the reaction product of a dihydroxy functional polyether and/or a trihydroxy functional polyether with toluene diisocyanate such that all of the hydroxy is reacted to form urethane linkages leaving isocyanate groups for further reaction. This type of reaction product is termed a prepolymer which may cure by itself on exposure to moisture or by the stoichiometric addition of polycarbinols or other polyfunctional reactive materials which react with isocyanates. The urethane elastomers are commercially prepared having various ratios of isocyanate compounds and polyethers or polyesters.

The most common of the urethane elastomers are those containing hydroxyl functional polyethers or polyesters and, low molecular weight polyfunctional, polymeric isocyanates. Another common material for use with hydroxyl functional polyethers and polyesters is toluene diisocyanate.

Nonlimiting examples of suitable urethane rubbers include the PELLETHANE™ thermoplastic polyurethane elastomers available from the Lubrizol Corporation; ESTANE™ thermoplastic polyurethanes, TECOFLEX™ thermoplastic polyurethanes, CARBOTHANE™ thermoplastic polyurethanes, TECOPHILIC™ thermoplastic polyurethanes, TECOPLAST™ thermoplastic polyurethanes, and TECOTHANE™ thermoplastic polyurethanes, all available from Noveon; ELASTOLLAN™ thermoplastic polyurethanes and other thermoplastic polyurethanes available from BASF; and additional thermoplastic polyurethane materials available from Bayer, Huntsman, Lubrizol Corporation, Merquinsa and other suppliers. Preferred urethane rubbers are those so-called "millable" urethanes such as MILLATHANE™ grades from TSI Industries.

Additional information on such urethane materials can be found in Golding, Polymers and Resins, Van Nostrande, 1959, pages 325 et seq. and Saunders and Frisch, Polyurethanes, Chemistry and Technology, Part II, Interscience Publishers, 1964, among others.

The silicone and urethane rubbers can be used alone or in combination with one another, and are typically used in amounts ranging from 90 to 10 wt % based on the weight of the composition. Preferably, the rubbers are used in an amount ranging from 80 to 20, more preferably from 50 to 75, wt % based on the weight of the composition.

Conductive Filler

Any conductive filler that will impart a volume resistivity of less than 1,000, preferably less than 500 and more preferably less than 250, ohm-cm, to the semiconductive composition can be used in the practice of this invention. Representative conductive fillers include but are not limited to conductive carbon blacks and metal particulates. The conductive carbon blacks can be selected from any of the carbon blacks listed in ASTM D-1765-76, which includes carbon blacks so listed in accordance with their ASTM designations: N110 N242 N326 N358 N568 N765 N121 N270 N327 N363 N601 N774 N166 N285 N330 N375 N650 N785 S212 N293 N332 N440 N660 N787 N219 N294 N339 N472 N683 N880 N220 S300 N347 N539 N741 N907 N231 S301 N351 N542 N754 N990 N234 S315 N356 N550 N762. Of course, any other carbon blacks of a similar nature and that are suitable and effective for use in rubber compounding, such as Ketjenblack EC, Vulcan C and XC blacks, acetylene blacks, and other so-called "conductive blacks," newer carbon blacks which are similar to any of the above but may be designated by other numbers, and, of course, mixtures, are also included in the conductive blacks that can be used in the practice of this invention.

In one embodiment, the carbon black is a graphene such as graphite, carbon nanotubes and/or fullerenes or their mixtures with other carbon blacks. The average particle size of such a material is typically of nano-scale proportions.

Optionally alone, or with a carbon black, at least one metal powder or particle, of a conductive nature can be used as the conductive filler. These metal powders or particles typically have an average particle size of 0.1 to 100, more typically 0.3 to 30, microns as measured by X-ray line broadening. The metal particles/powders may have any particle shape desired although, as is known, the shape selection may depend upon the intended end use of the metal-filled product. Spherical shapes, platelets, prismatic shapes, whiskers, and the like, can be used.

Metals that can be used as a conductive filler include, alone or in admixture with one or more other such metals, or as finely powdered alloys, aluminum, indium, tin, lead, bismuth, as well as Groups II-B through VII-B elements of the Periodic System including such as zinc, cadmium, scandium, titanium, zirconium, vanadium, chromium, molybdenum, tungsten, manganese, rhenium, iron, ruthenium, osmium, cobalt, rhodium, iridium, nickel, palladium, platinum, and the like. Particularly satisfactory for convenience and relative cheapness are aluminum, zinc, iron, nickel, tin, lead, and silver. Copper, while conductive, may in its metallic form be objectionable in some rubber compounding formulations.

Mixtures of one or more carbon blacks with one or more metal powders or particles can be employed, in any relative proportion, such as a weight ratio of 1:99 to 99:1.

The fillers may carry or contain various surface coatings or treatments, such as silanes, fatty acids, and the like.

The conductive filler used in the practice of this invention comprises at least 1, preferably at least 10 and more preferably at least 20, wt % of the composition. The only limit on the maximum amount of filler in the composition is that imposed by practical considerations such as cost and performance, but typically a general maximum comprises less than 40, more typically less than 35, wt % of the composition.

Additives

The compositions of this invention may also contain additives. Representative additives include but are not limited to antioxidants, curing agents, cross linking co-agents, cure boosters and scorch retardants, processing aids, coupling agents, ultraviolet stabilizers (including UV absorbers), antistatic agents, nucleating agents, slip agents, plasticizers (particularly plasticizer oil), lubricants, viscosity control agents, tackifiers, anti-blocking agents, surfactants, extender oils, acid scavengers, flame retardants and metal deactivators. These additives are typically used a conventional manner and in conventional amounts, e.g., from 0.01 wt % or less to 20 wt % or more based on the weight of the composition.

Suitable cure agents include the organic peroxides, more suitably those with one hour half lives at temperatures greater than 120° C. Examples of useful organic peroxides include 1,1-di-t-butyl peroxy-3,3,5-trimethylcyclohexane, dicumyl peroxide, 2,5-dimethyl-2,5-di(t-butyl peroxy)hexane, t-butyl-cumyl peroxide, di-t-butyl peroxide, and 2,5-dimethyl-2,5-di-(t-butyl peroxy)hexyne. Scorch inhibitors include 2,2,6,6-tetramethylpiperidinoxyl (TEMPO) and 4-hydroxy-2,2,6,6-tetramethylpiperidinoxyl (4-hydroxy TEMPO).

Suitable UV light stabilizers include hindered amine light stabilizers (HALS) and UV light absorber (UVA) additives. Representative UV absorber (UVA) additives include benzotriazole types such as Tinuvin 326 and Tinuvin 328 commercially available from Ciba, Inc. Blends of HAL's and UVA additives are also effective. Examples of antioxidants include hindered phenols such as tetrakis[methylene(3,5-di-tert-butyl-4-hydroxyhydro-cinnamate)]methane; bis[(beta-(3,5-di-tert-butyl-4-hydroxybenzyl)methylcarboxyethyl)]-sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)-hydrocinnamate; phosphites and phosphonites such as tris(2,4-di-tert-butylphenyl)phosphite and di-tert-butylphenyl-phosphonite; thio compounds such as dilaurylthiodipropionate, dimyristylthiodipropionate, and distearylthiodipropionate; varioussiloxanes; polymerized 2,2,4-trimethyl-1,2-dihydroquinoline, n,n'-bis(1,4-dimethylpentyl-p-phenylenediamine), alkylated diphenylamines, 4,4'-bis(alpha,alpha-dimethylbenzyl)diphenylamine, diphenyl-p-phenylenediamine, mixed di-aryl-p-phenylenediamines, and other hindered amine anti-degradants or stabilizers.

Examples of processing aids include but are not limited to metal salts of carboxylic acids such as zinc stearate or calcium stearate; fatty acids such as stearic acid, oleic acid, or erucic acid; fatty amides such as stearamide, oleamide, erucamide, or N,N'-ethylene bis-stearamide; polyethylene wax; oxidized polyethylene wax; polymers of ethylene oxide; copolymers of ethylene oxide and propylene oxide; vegetable waxes; petroleum waxes; non ionic surfactants; silicone fluids and polysiloxanes.

Compounding

In one embodiment the components of the compositions used in the practice of this invention are added to a batch mixer or extruder for melt blending. The components can be added in any order or first preparing one or more masterbatches for blending with the other components. In one embodiment a masterbatch of conductive filler in one or a blend of resins is prepared and then added to the other resin or resins. Additives are usually blended with one or more other components before being added to the bulk resins and/or filler. Typically the melt blending is conducted at a temperature above the highest melting polymer but lower than the activation temperature of peroxide (if one is present). The melt blended composition is then either delivered to a mold or passed through a die for shaping into the desired article, or converted to pellets, film or some other form for storage or to prepare the material for feeding to a next shaping or processing step. One preferred article is a molded electrical article made via an injection molding process in which the compounded material is fed to the injection molding machine to manufacture a molded part of a given design. Optionally, if shaped into pellets or some similar configuration, then the pellets, etc. can be coated with an anti-block agent to facilitate handling while in storage.

Compounding of the compositions can be effected by standard equipment known to those skilled in the art. Examples of compounding equipment are internal batch mixers, such as a Banbury™ or Bolling™ internal mixer. Alternatively, continuous single, or twin screw, mixers can be used, such as Farrel™ continuous mixer, a Werner and Pfleiderer™ twin screw mixer, or a Buss™ kneading continuous extruder. The type of mixer utilized, and the operating conditions of the mixer, will affect properties of the composition such as viscosity, volume resistivity, and extruded surface smoothness.

A cable containing a semiconductive layer comprising a composition of this invention can be prepared with various types of extruders, e.g., single or twin screw types. These compositions should have extrusion capability on any equipment suitable for thermoplastic polymer extrusion. The most common fabrication equipment for wire and cable products is a single screw plasticizing extruder. A description of a conventional single screw extruder can be found in U.S. Pat. No. 4,857,600. An example of co-extrusion and an extruder therefore can be found in U.S. Pat. No. 5,575,965. A typical extruder has a hopper at its upstream end and a die at its downstream end. Granules of the polymeric compound feed through a hopper into the extruder barrel, which contains a screw with a helical flight. The length to diameter ratio of extruder barrel and screw is typically in the range of about 15:1 to about 30:1. At the downstream end, between the end of the screw and the die, there is typically a screen pack supported by a breaker plate used to filter any large particulate contaminates from the polymer melt. The screw portion of the extruder is typically divided up into three sections, the solids feed section, the compression or melting section, and the metering or pumping section. The granules of the polymer are conveyed through the feed zone into the compression zone, where the depth of the screw channel is reduced to compact the material, and the thermoplastic polymer is fluxed by a combination of heat input from the extruder barrel, and frictional shear heat generated by the screw. Most extruders have multiple barrel heating zones (more than two) along the barrel axis running from upstream to downstream. Each heating zone typically has a separate heater and heat controller to allow a temperature profile to be established along the length of the barrel. There are additional heating zones in the crosshead and die assembles, where the pressure generated by the extruder screw causes the melt to flow and be shaped into the wire and cable product which typically moves perpendicular to the extruder barrel. After shaping, thermoplastic extrusion lines typically have a water trough to cool and solidify the polymer into the final wire or cable product, and then have reel take-up systems to collect long lengths of this product. There are many variations of the wire and cable fabrication process, for example, there are alternate types of screw designs such as barrier mixer or other types, and alternate processing equipment such as a polymer gear pump to generate the discharge pressure. The compositions outlined in this disclosure can typically be processed on any fabrication equipment that is suitable for extruding wire and cable compositions.

Insulation Layer

The insulation layer that is typically adjacent to the semiconductive layer in the practice of this invention is well known in the art, its composition can vary widely, and it is not critical to the practice of this invention. The insulation layer can comprise, for example, one or more of an olefin elastomer, olefin block copolymer, EPDM, EPR or silicone, particularly a functionalized polyolefin such as a silane-grafted polyolefin or a silane-olefin copolymer crosslinked with one or more crosslinking agents, e.g., hydroxy-terminated silicone. The insulation layer can be filled or unfilled, and it is typically thicker than the semiconductive layer. Representative insulation layers are described in, among other documents, U.S. Pat. No. 5,246,783, WO 00/41187 and EP 1 619 217 A1.

The following examples illustrate various embodiments of this invention. All parts and percentages are by weight unless otherwise indicated.

SPECIFIC EMBODIMENTS

Sample Preparation

All samples are prepared using a laboratory scale Brabender batch mixer. The mixer is initially set at 120° C. and a rotor speed of 35 revolutions per minute (rpm). First the polymer resins are loaded into the mixer, and then the carbon black is added slowly and mixed for 15 minutes. Whenever possible, polyolefin and/or hydrocarbon rubber are added first, then carbon black, then non-polyolefin rubber, but this may not always be possible as some compositions make this impractical to fill the mixer. In no case, however, is a masterbatch made for later addition of the non-olefin rubber. Depending on the level of carbon black and the resin type, melt temperatures ranges from 130 to 140° C. at the end of the mixing cycle. In some cases it is possible to cool the material in the mixer without removal; in other cases it is necessary to remove the compound from the mixer for cooling purposes prior to peroxide addition. In such cases, the material is re-loaded for peroxide addition. In all cases, after peroxide is added, the mixture is compounded for additional 10 minutes at 35 rpm to incorporate the peroxide while ensuring the compound temperature remains below 125° C. to prevent premature crosslinking. The compound thus prepared is compression molded into 75 mil plaques which are cured in the press (Wabash Model #30-1212-451-4ST MBX) for 10 min at 175° C. Specimens are cut from the cured plaque for mechanical properties measurements. The composition components and their respective properties are reported in Table 1. Comparative examples are reported in Table 2 and examples of the invention are reported in Table 3.

Volume resistivity test specimens are 8×2×0.75 inch plaques prepared by compression molding the compound of interest under thermoplastic conditions. The specimens are cooled to room temperature and removed from the mold. Flattened copper conductors (16 AWG) are wrapped around each plaque at each end of the plaque so that the conductors are 2 inches apart, and each is about 1 inch from a plaque end. The wrapped plaques are placed back into the 8×2 inch mold, and the plaque is cured with mounted conductors in the press for 10 min at 175° C. The plaques are then cooled, released from the mold and ready for testing.

TABLE 1

Composition Components and Their Properties

| Resin | Supplier | Description | Density (g/cm³) | Melt Index ($I_2$, 190° C.) | Mooney Viscosity (ML 1 + 4, 100° C.) | Shore A |
|---|---|---|---|---|---|---|
| ENGAGE 7447 | Dow | Ethylene/1-butene Elastomer | 0.865 | 5.0 | | 64 |
| ENGAGE 7467 | Dow | Ethylene/1-butene Elastomer | 0.862 | 1.2 | | 52 |
| NORDEL IP 3722 | Dow | Hydrocarbon Rubber | 0.880 | | 18 | 71 |
| NORDEL IP 4640 | Dow | Hydrocarbon Rubber | 0.860 | | 40 | 61 |
| NORDEL IP3430 | Dow | Hydrocarbon Rubber | 0.860 | | 44 | 54 |
| SILASTIC GP-30 | Dow Corning | Silicone Rubber | 1.090 | | N/A | 34 |
| SILASTIC 130-25 | Dow Corning | Silicon Rubber | 1.090 | | N/A | 22 |
| MILLATHANE 5004 | TSE Industries | Polyurethane Rubber | 1.210 | | 50-70 | 60 |

Density measured by ASTM D-792-00, Method B.
$I_2$ measured by ASTM D-1238-04 (version C, Condition 190° C./2.16 kg).
Mooney Viscosity measured by ASTM D-1646-94.
Shore A measured by ASTM D-2240.

TABLE 2

Comparative Examples

| Comparative Example | CE1 | CE2 | CE3 | CE4 |
|---|---|---|---|---|
| Compositions Expressed as % wt of Total | | | | |
| ENGAGE 7447 | 63.40 | | | |
| ENGAGE 7467 | | | 20.64 | |
| Nordel IP3722 | | 63.40 | | |
| Nordel IP3430 | | | 29.48 | 50.85 |
| Carbon Black (XC-500) | 34.10 | 34.10 | 31.45 | 30.00 |
| Plasticizer (SUNPAR 2280) | 0.00 | 0.00 | 14.74 | 15.00 |
| Zinc Oxide | | | 1.97 | 2.00 |
| Dicumyl Peroxide | 2.50 | 2.50 | 1.72 | 2.15 |
| Total | 100.0 | 100.0 | 100.0 | 100.0 |
| Shore A | 85 | 90 | 67 | 55 |
| Tensile @ break (psi) | 3028 | 3079 | 1132 | 953 |
| Elong @ break (%) | 291 | 145 | 689 | 653 |
| M100 (psi) | 1306 | 2223 | 271 | 165 |
| Trouser Tear Strength (1bf/in) | 26 | 14 | 56 | 43 |
| Volume Resistivity (95° C., 7 days, ohm-cm) | | | | |
| Day 1 | 233 | 604 | 589 | 1758 |
| Day 2 | 246 | 582 | 577 | 1666 |
| Day 3 | 257 | 773 | 571 | 1615 |
| Day 4 | 400 | 747 | 567 | 1585 |
| Day 5 | 893 | 738 | 564 | 1564 |
| Day 6 | 1569 | 759 | 562 | 1544 |
| Day 7 | 2333 | 771 | 558 | 1534 |

Shore A measured by ASTM D-2240.
Tensile @ break measured by ASTM D-638.
Elongation @ break measured by ASTM 638.
M100 measured by ASTM D-638.
Trouser tear strength measured by ASTM D1938-08.
Volume resistivity is measured by ASTM D-991.

CE1 shows data for a blend of a polyolefin elastomer (0.865 g/cm³ density, 5 MI, Shore A=64) with 34.1% carbon black and 2.5% peroxide. The compound is quite stiff for the application, with a shore A=85, M100=1306 psi, although good tensile strength, but poor elongation of 291% and poor tear resistance. The volume resistivity was unstable, initially at 233 ohm-cm then increasing to over 2300 ohm-cm after 7 days aging at 95° C.

CE2 shows data for a blend of a hydrocarbon rubber (0.880 g/cm³ density, Shore A=71) with 34.1% carbon black and 2.5% peroxide. The compound is also stiff for the application, with a shore A=90, M100>2000 psi, although good tensile strength but poor elongation of 145%, and poor tear. The volume resistivity was more stable than CE1, initially at 600 ohm-cm then increasing to only 771 ohm-cm after 7 days at 95° C.

CE3 shows data for a blend of a polyolefin elastomer (0.862 g/cm³ density, 1.2 MI, Shore A=51), a hydrocarbon rubber (0.860 g/cm³ density, Shore A=54) with 31.45% carbon black, 14.74% plasticizer oil to improve flexibility, 1.97% zinc oxide and 1.72% peroxide. The compound showed significantly improved flexibility over the first two, with a shore A=67 and M100=271, and also improved elongation of 689%, good tensile strength and significantly improved tear resistance. At this level of carbon black, the volume resistivity was also stable at ~560 ohm-cm after 7 days at 90° C.

CE4 shows data for a blend of a hydrocarbon rubber (0.860 g/cm³ density, Shore A=54) with 30% carbon black, 15% plasticizer oil, 2% zinc oxide and 2.15% peroxide. The compound also showed significantly improved flexibility over previous examples, with a shore A=55, M100=165 psi, relatively good tensile strength (953 psi), good elongation (653%) and good tear resistance. Although the volume resistivity was stable after 7 days at 90° C. at ~1550 ohm-cm, at this level of carbon black, the compound is not acceptable for this application where the target volume resistivity is <1000 ohm-cm and preferably <500 ohm-cm.

TABLE 3

Examples of the Invention

Compositions Expressed as % wt of Total Invention Examples

|  | Ex. 1 | Ex. 2 | Ex. 3 | Ex. 4 | Ex. 5 | Ex. 6 | Ex. 7 |
|---|---|---|---|---|---|---|---|
| ENGAGE 7447 | 39.02 | | | | | | |
| ENGAGE 7467 | | 34.15 | 37.33 | 19.65 | | | |
| Nordel IP3722 | | | | | | | |
| Nordel IP3430 | | | | 19.65 | 28.38 | 28.38 | 33.38 |
| Millathane 5004 | 39.02 | 24.39 | 24.56 | | | | |
| Silastic GP-30 | | | | 17.68 | 35.00 | | |
| Silastic 130-25 | | | | | | 35.00 | 35.00 |
| Carbon Black (XC-500) | 19.51 | 24.39 | 19.65 | 24.65 | 25.00 | 25.00 | 20.00 |
| Plasticizer (Sunpar 2280) | | 14.63 | 14.73 | 14.73 | 7.50 | 7.50 | 7.50 |
| Zinc Oxide | | | 1.96 | 1.96 | 2.00 | 2.00 | 2.00 |
| DiCumyl Peroxide | 2.44 | 2.44 | 1.77 | 1.77 | 2.15 | 2.15 | 2.15 |
| Total | 100.0 | 100.0 | 100.0 | 100.0 | 100.0 | 100.0 | 100.0 |
| Shore A | 79 | 69 | 67 | 60 | 59 | 56 | 46 |
| Tensile @break (psi0 | 2367 | 952 | 1033 | 942 | 1023 | 961 | 1006 |
| Elong @ break (%) | 309 | 561 | 659 | 833 | 335 | 443 | 578 |
| M100 (psi) | 767 | 313 | 300 | 184 | 278 | 266 | 145 |
| Trouser Tear Strength (lbf/in) | 80 | 52 | 54 | 43 | 17.3 | 18 | 26 |
| Volume Resistivity (95° C., 7 days, ohm-cm) | | | | | | | |
| Day 1 | 224 | 56 | 327 | 553 | 76 | 16 | 290 |
| Day 2 | 199 | 55 | 322 | 534 | 68 | 15 | 265 |
| Day 3 | 182 | 54 | 323 | 525 | 64 | 15 | 251 |
| Day 4 | 156 | 54 | 328 | 520 | 61 | 15 | 242 |
| Day 5 | 123 | 54 | 333 | 515 | 59 | 16 | 237 |
| Day 6 | 104 | 54 | 340 | 512 | 58 | 17 | 233 |
| Day 7 | 95 | 54 | 347 | 507 | 57 | 19 | 230 |

Example 1 shows data for a blend containing 39% of a polyolefin elastomer (0.865 g/cm$^3$ density, 5 MI, Shore A=64), 39% of a polyurethane rubber (1.210 den, Shore A=60), 19.5% carbon black and 2.44% peroxide. Compared to CE1, this compound shows a Shore A=79, M100=767, a high tensile strength, still comparably poor elongation, but drastically improved tear resistance. Most importantly, however, the fact that although it utilizes ~42% less carbon black, it has a lower and much more stable volume resistivity at ~100 ohm-cm after 7 days aging at 95° C.

Example 2 shows results for a blend containing 34.15% of a polyolefin elastomer (0.862 g/cm$^3$ density, 1.2 MI, Shore A=51), 24.39% of a polyurethane rubber (1.210 g/cm$^3$ density, Shore A=60), 14.63% plasticizer oil and 2.44% peroxide. The data show improved Shore A=69, M100=313, good tensile (952 psi) and improved elongation (561%) and good tear resistance. Like Example 2, at only 24.4% carbon black, the compound exhibits a low and stable volume resistivity ~55 ohm-cm after 7 days aging at 95° C.

Example 3 shows results for a blend containing 37.3% of a polyolefin elastomer (0.862 g/cm$^3$ density, 1.2 MI, Shore A=51), 24.56% of a polyurethane rubber (1.210 g/cm$^3$ density, Shore A=60), 14.73% plasticizer oil, 19.65% carbon black, 1.96 zinc oxide and 1.77% peroxide. The data show lower compound Shore A=67, M100=300, good tensile (1033 psi) and improved elongation (659%) and good tear resistance. Like Example 2 and even at only 19.65% carbon black, the compound has a stable volume resistivity of ~350 ohm-cm after 7 days aging at 95° C.

Example 4 shows results for a blend containing 19.65% of a polyolefin elastomer (0.862 g/cm$^3$ density, 1.2 MI, Shore A=51), 19.65% hydrocarbon rubber (0.860 g/cm$^3$ density, Shore A=54), 17.68% of a silicone rubber (1.090 g/cm$^3$ density, Shore A=34), 24.56% carbon black, 14.73% plasticizer oil, 1.96% zinc oxide and 1.77% peroxide. The data show a further improved Shore A=60, M100=184, good tensile (942 psi), high elongation (833%) and good tear resistance. Like Example 2, at only 24.56% carbon black, the compound has stable volume resistivity ~520 ohm-cm after 7 days aging at 95° C. These results should be compared to those of CE3 which used 31.45% carbon black (~22% more).

Example 5 shows results for a blend containing 28.38% of a hydrocarbon rubber (0.860 g/cm$^3$ density, Shore A=54), 35% of a silicone rubber (1.090 g/cm$^3$ density, Shore A=34), 25% carbon black, 7.5% plasticizer oil, 2.0% zinc oxide and 2.15% peroxide. Compared to CE4, the data show at only 25% carbon black, the compound has much lower and stable volume resistivity ~60 ohm-cm after 7 days aging at 95° C.

Example 6 shows results for a blend containing 28.38% of a hydrocarbon rubber (0.860 g/cm$^3$ density, Shore A=54), 35% of a silicone rubber (1.090 g/cm$^3$ density, Shore A=22), 25% carbon black, 7.5% plasticizer oil, 2.0% zinc oxide and 2.15% peroxide. Compared to CE4, this compound has equivalent shore A=56, but the data again show that at only 25% carbon black, the compound has much lower and stable volume resistivity ~15 ohm-cm after 7 days aging at 95° C. The mechanical properties of this sample can be further improved given this low volume resistivity.

Example 7 illustrates how compound properties can be balanced and shows results for a blend containing 33.38% of a hydrocarbon rubber (0.860 g/cm$^3$ density, Shore A=54), 35% of a silicone rubber (1.090 g/cm$^3$ density, Shore A=34), 20% carbon black, 7.5% plasticizer oil, 2.0% zinc oxide and 2.15% peroxide. Compared to CE4, the data show much lower shore A=46, lower M100=145, but most importantly, at even 20% carbon black, the compound again has a much lower and stable volume resistivity ~230 ohm-cm after 7 days aging at 95° C. with improved balance of tensile, elongation and tear resistance compared to Examples 5 and 6 above.

Although the invention has been described with certain detail through the preceding specific embodiments, this detail is for the primary purpose of illustration. Many variations and modifications can be made by one skilled in the art without departing from the spirit and scope of the invention as described in the following claims.

What is claimed is:

1. A molded or extruded article comprising at least one insulation layer and at least one semiconductive layer, the semiconductive layer comprising in weight percent:
   A. 20 to 30 wt % of conductive filler comprising conductive carbon black;
   B. polymers consisting of
      (i) 20 to 80 wt % of a non-olefin elastomer selected from the group consisting of silicone rubber, urethane rubber, and combinations thereof; and
      (ii) 20 to 80 wt % of an olefin elastomer selected from the group consisting of polyolefin homopolymers, ethylene/α-olefin interpolymers propylene/α-olefin interpolymers, and combinations thereof; and
   C. optionally, 0.5 to 2.5 wt % of peroxide.

2. The article of claim 1 in which the article is an electrical part of shielded cable.

3. The article of claim 2 in which the article further comprises a second semiconductive layer and the insulation layer is between the first and second semiconductive layers.

4. The article of claim 2 in which the conductive filler comprise a metal particulate or powder.

5. The article of claim 2 in which the conductive filler comprise a blend of carbon black and metal particulate or powder.

6. The article of claim 2 in which the olefin elastomer is at least one of an ethylene-propylene rubber and an ethylene-propylene-diene monomer rubber.

7. The article of claim 6 in which the olefin elastomer is a linear, homogeneously branched polyethylene resin.

8. The article of claim 2 in which the non-olefin and olefin elastomers are present at a non-olefin:olefin elastomer weight ratio between 10:90 and 90:10.

9. The article of claim 2 in which the semiconductive layer further comprises at least one additive.

10. The article of claim 9 in which at least one additive is a plasticizer oil.

11. The article of claim 1 in which the insulation layer comprises a silane-grafted polyolefin or silane-olefin copolymer crosslinked with hydroxyl-terminated silicone.

12. The article of claim 3 in which the insulation layer comprises one or more of an olefin elastomer, olefin block copolymer, EPDM, EPR or silicone.

13. A semi-conductive composition comprising, based on the weight of the composition:
   A. 20 to 30 wt % of conductive filler comprising conductive carbon black;
   B. polymers consisting of
      (i) 20 to 80 wt % of a non-olefin elastomer selected from the group consisting of silicone rubber, urethane rubber, and combinations thereof; and
      (ii) 20 to 80 wt % of an olefin elastomer selected from the group consisting of polyolefin homopolymers, ethylene/α-olefin interpolymers propylene/α-olefin interpolymers, and combinations thereof; and
   C. optionally, 0.5 to 2.5 wt % of peroxide.

* * * * *